United States Patent
Legré et al.

(10) Patent No.: US 9,634,835 B2
(45) Date of Patent: Apr. 25, 2017

(54) APPARATUS AND METHOD FOR THE DETECTION OF ATTACKS TAKING CONTROL OF THE SINGLE PHOTON DETECTORS OF A QUANTUM CRYPTOGRAPHY APPARATUS BY RANDOMLY CHANGING THEIR EFFICIENCY

(75) Inventors: Matthieu Legré, Geneva (CH); Grégoire Ribordy, Geneva (CH)

(73) Assignee: ID Quantique SA, Carouge (CH)

( * ) Notice: Subject to any disclaimer, the term of this patent is extended or adjusted under 35 U.S.C. 154(b) by 354 days.

(21) Appl. No.: 13/877,667

(22) PCT Filed: Oct. 10, 2011

(86) PCT No.: PCT/IB2011/002372
§ 371 (c)(1),
(2), (4) Date: Jan. 14, 2014

(87) PCT Pub. No.: WO2012/046135
PCT Pub. Date: Apr. 12, 2012

(65) Prior Publication Data
US 2014/0119537 A1 May 1, 2014

Related U.S. Application Data

(60) Provisional application No. 61/391,127, filed on Oct. 8, 2010.

(51) Int. Cl.
*H04L 9/08* (2006.01)
*H04L 9/00* (2006.01)

(52) U.S. Cl.
CPC ............ *H04L 9/0852* (2013.01); *H04L 9/002* (2013.01)

(58) Field of Classification Search
CPC .................................................. H04L 9/0852
See application file for complete search history.

(56) References Cited

U.S. PATENT DOCUMENTS

| 6,249,009 B1 * | 6/2001 | Kim | ........................ | G06F 7/588 250/580 |
| 7,502,476 B1 * | 3/2009 | Trifonov | ............... | H04L 9/0852 380/256 |

(Continued)

FOREIGN PATENT DOCUMENTS

WO WO 2009/083022 A1 7/2009

OTHER PUBLICATIONS

Id Quantique SA, Clavis 2: the most versatile Quantum key distribution research platform, Company brochure, Sep. 1, 2008, p. 1-4, ver. 1.2.

(Continued)

*Primary Examiner* — Farid Homayounmehr
*Assistant Examiner* — Thanh T Le
(74) *Attorney, Agent, or Firm* — Da Vinci Partners LLC; John Moettell

(57) ABSTRACT

An apparatus and method for revealing both attack attempts performed on the single-photon detector(s) of a quantum cryptography system and Trojan horse attack attempts performed on quantum cryptography apparatus containing at least one single photon detector. The attacks detection relies on both the random modification of the setting parameters of the said single-photon detector(s) and the comparison of the measured detection probability values for each setting parameter with the expected detection probability values. The modified parameter of the single-photon detector can be its efficiency or its timing of activation for example.

10 Claims, 10 Drawing Sheets

(56) References Cited

U.S. PATENT DOCUMENTS

| | | | |
|---|---|---|---|
| 7,792,288 B2* | 9/2010 | Kollmitzer | H04L 9/0855 380/256 |
| 2004/0032954 A1* | 2/2004 | Bonfrate | H04L 9/0858 380/263 |
| 2004/0139132 A1* | 7/2004 | Lutkenhaus | H04L 9/0852 708/250 |
| 2004/0161109 A1* | 8/2004 | Trifonov | H04L 7/0008 380/277 |
| 2004/0233935 A1* | 11/2004 | Yuan | B82Y 10/00 370/474 |
| 2005/0190922 A1* | 9/2005 | LaGasse | H04L 9/0858 380/278 |
| 2006/0204010 A1* | 9/2006 | Mitchell | H04L 9/0852 380/278 |
| 2007/0248229 A1* | 10/2007 | Kawamoto | H04B 10/70 380/256 |
| 2009/0003591 A1* | 1/2009 | Murakami | H04L 9/0852 380/28 |
| 2009/0010435 A1* | 1/2009 | Zbinden | H04L 9/0852 380/256 |
| 2009/0039237 A1* | 2/2009 | Inoue | G01J 1/44 250/214 R |
| 2011/0127415 A1* | 6/2011 | Kanter | G01J 1/44 250/252.1 |
| 2012/0016635 A1* | 1/2012 | Brodsky | G01J 1/42 702/181 |

OTHER PUBLICATIONS

Yuan Z L et al., Avoiding the Detector Blinding Attack on Quantum Cryptography, Internet Citation from http://arxiv.org, Sep. 30, 2010, p. 1-4.

Vadim Makarov, Controlling passively quenched single photon detectors by bright light, New Journal of Physics, Jun. 1, 2009, vol. 11, ISSN: 1367-2630.

Lars Lydersen et al., Thermal blinding of gated detectors in quantum cryptography, Internet Citation from http://arxiv.org, Sep. 14, 2010, p. 1-10.

Tansu Alpcan and Tamer Basar, An Intrusion Detection Game with Limited Observation, Internet Citation from http://www.tansu.alpcan.org/papers/isdg06.pdf, Jul. 1, 2006, p. 9PP.

PCT/IB2011/002372, International Search Report, Aug. 23, 2012.

* cited by examiner

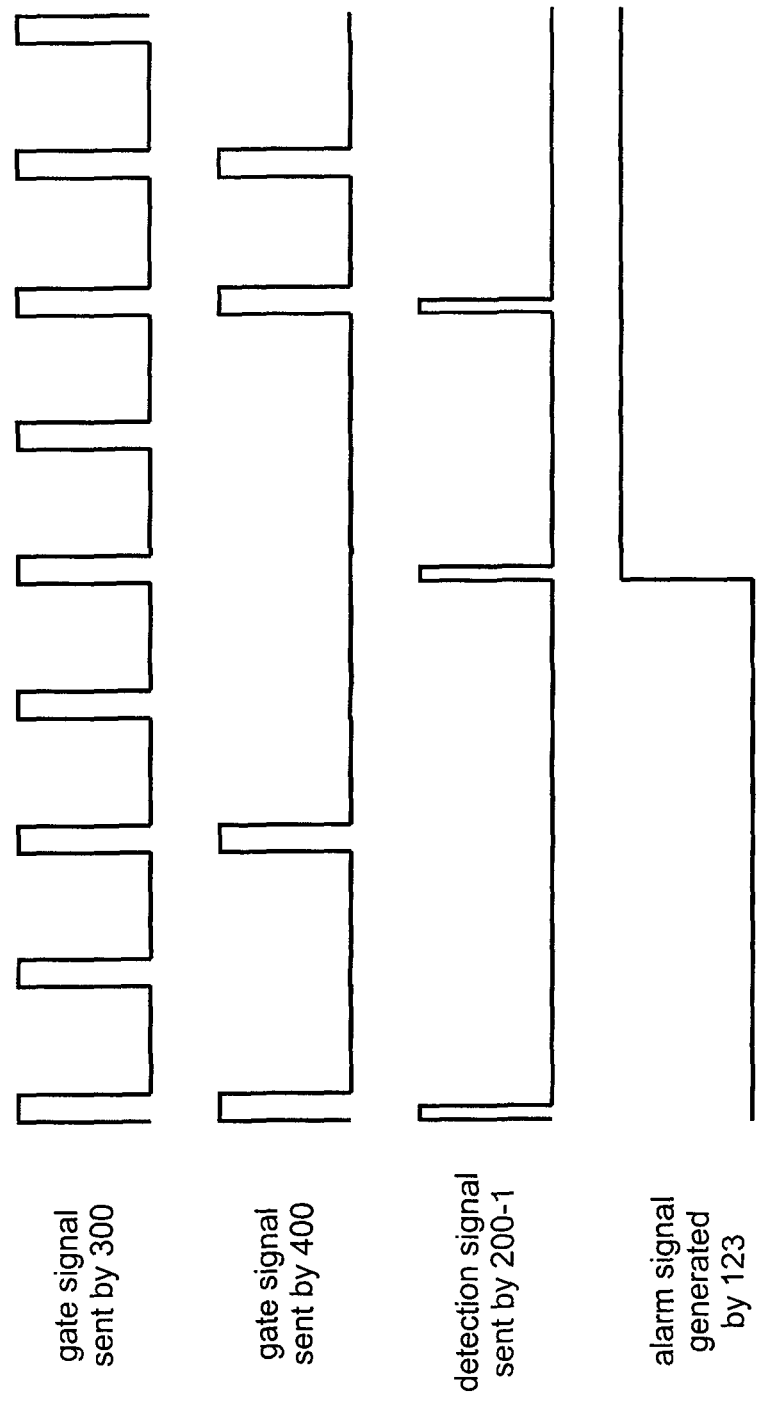

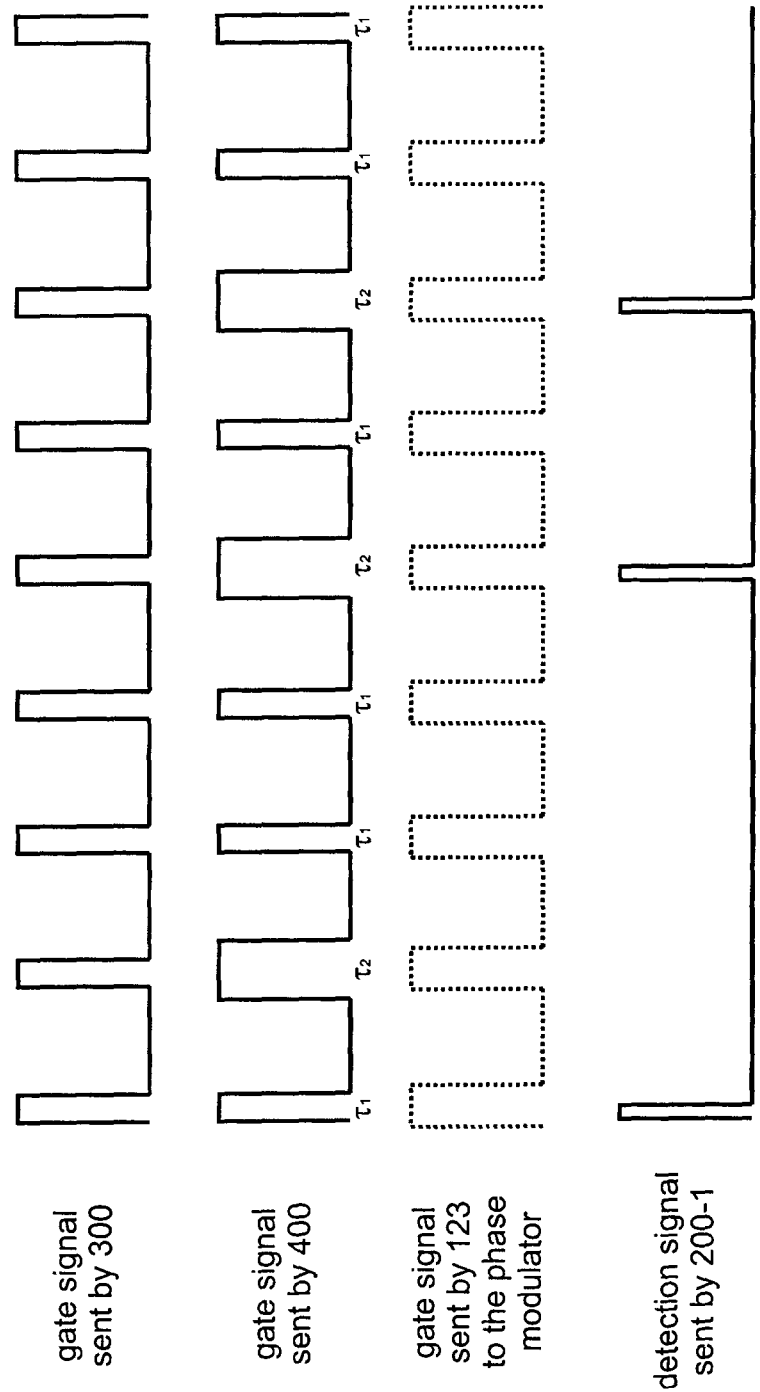

APPARATUS AND METHOD FOR THE DETECTION OF ATTACKS TAKING CONTROL OF THE SINGLE PHOTON DETECTORS OF A QUANTUM CRYPTOGRAPHY APPARATUS BY RANDOMLY CHANGING THEIR EFFICIENCY

CROSS REFERENCE TO RELATED APPLICATIONS

This application claims the benefit of U.S. Provisional Application No. 61/391,127, filed Oct. 8, 2010, the content of which is incorporated herein by reference thereto.

BACKGROUND OF THE INVENTION

This invention relates generally to the field of quantum cryptography, and more particularly to an apparatus and method for allowing the detection of attacks either taking control of the single photon detectors of a quantum cryptography apparatus or reading the measurement bases used by the receiver of quantum cryptography apparatus to analyze the qubit. Both attacks are performed by sending bright light into the receiver through the quantum channel.

The theoretical security of quantum cryptography ("QC") has been formally proven for an ideal implementation. A detailed discussion of QC is provided in the background of the US provisional patent application incorporated above by reference herein and is useful for full understanding of the invention. Practical implementations of QC systems attempt to be as close as possible to the model described in security proofs, but there always remain discrepancies between model and implementation.

Recently, researchers have attempted to take advantage of these discrepancies to break the security of QC systems. Different strategies have been proposed and tested, and they have been generally targeted at the single photon detectors. The first class of attacks takes advantage of the temporal mismatch between the two detectors of Bob. It should be noted that QC systems have in general two single-photon detectors (SPDs). In the case of the BB84 protocol, each detector is assigned to a bit value. Hence, if a spy knows which detector fires, he knows what the bit value exchanged between the emitter and the receiver is. Y. Zhao, C. F. Fung, B. Qi, C. Chen, and H. Lo have described an implementation of this attack in Physical Review A vol. 78 (2008), the content of the technical description of which is incorporated herein by reference thereto (any claims of success are not herein incorporated by reference). The presence of a small temporal mismatch between the two detectors may be able to be exploited to send light at a time when detector 1 is active and detector 2 is not, and vice versa. This means that if a spy makes the photon arrive at a specific time, it is possible that he can impose the detection to be only on detector 1 or on detector 2.

The latest class of attacks performed on the SPDs of a QC system purports to allow one to take control of the detectors totally. The first demonstration has been performed on a Si avalanche photodiode ("APD") based SPD by V. Makarov. A description of this first method is given in New Journal of Physics Vol. 11 (2009), the content (excluding any claims of success) of the technical disclosure of which is incorporated herein by reference thereto. The main idea of this attack is to blind the Si APD based SPD by sending intense continuous wave ("CW") light onto it. Indeed, when the light amount is too large for the single photon detector, it enters into a saturation regime where the number of detections starts to decrease until it eventually reaches zero. If the light intensity is further increased, and the number of detections remains equal to zero: the detector can be blinded. The explanation for this phenomenon relies on the large number of detections due to the large number of photons of the bright light. The number of avalanches is so significant that the potential difference on the APD drops down to a value close to the breakdown voltage. This drop can easily be understood by the fact that a large number of avalanches means that a large current flows constantly through the APD. Considering the resistances which are mounted in series with the APD in a passive quenching circuit, the current going through the APD goes through the resistances too. Because the total voltage applied on all the components in series is fixed, the increase of the voltage on the resistances—due to this current—causes a decrease of the potential difference on the APD. If this drop is high enough, the APD remains in the Geiger mode but the avalanches which occur due to photon absorption are too small to be detected by the discriminator of the electrical circuit. Thanks to the bright light, the SPD may be blinded. When the bright light is turned off, the SPD becomes active again after only few microseconds. Launching the intense light again makes it possible to generate a detection and then blind the SPD again. By controlling the sequence of the bright light pulses, a spy may be able to blind the SPD for a certain period of time and then to force detection at the time he is interested in. In other words, the spy may be able to gain significant control on the single photon detection module. In more recent work, V. Makarov has presented another way which purports to control Si APD based SPDs (information can be found in his presentation given in Quantum Communication Workshop 2010 (see World Wide Web, under "sarafelloni" dot com domain, in the subfolder /QIW/QCW2010/infodownload/qcw2010-presentations), the content of the technical disclosure of which is incorporated herein by reference thereto (any claims of success are not herein incorporated by reference). This new method consists in blinding the SPD with CW light again, but in this case, the intensity of the CW light is larger that in the previous demonstration, so that the APD does not work in the Geiger mode any longer, but stays in the linear mode all the time. Then, when the spy sends a bright optical pulse, its detection in linear mode results in an electrical pulse at the output of the APD. If the intensity of the optical pulse is large enough, this method asserts that the amplitude of the electrical pulse can be high enough to be detected by the discriminator of the SPD. A spy may then be able to gain some degree of control on the SPD by first blinding the detector, then sending bright optical pulse which will be detected in linear mode. In this way, an eavesdropper can force the QC receiver to detect what the eavesdropper wants him to detect. If the eavesdropper can take control of the receiver single-photon detectors, he may have enough information to guess the final secret key.

Another class of attacks, called Trojan horse attacks, can be performed on QC systems by sending bright light into the QC system through the quantum channel. The main idea of Trojan horse attack is to analyze the light which comes back from the QC system in order to extract some information about the state of the QC system. In this case, the light which is sent into the QC system is used as a probe signal. Two examples of this class of attacks are demonstrated by A. Vakhitov, V. Makarov and D. R. Hjelme in Journal of Modern optics, vol. 48, 2023-2038 (2001), the content (excluding any claims of success) of the technical disclosure of which is incorporated herein by reference thereto, and by N. Gisin, S. Fasel, B. Kraus, H. Zbinden and G. Ribordy in Physical Review A, vol. 73, 022320 (2006), the content of the technical disclosure of which is incorporated herein by reference thereto. In both examples, the authors performed their attack on implementations of BB84 using phase coding as proposed by Paul Townsend et al. in "Single-photon interference in a 10 km long optical fiber interferometer", Electron. Lett. 29, 634-639 (1993), the content of which is incorporated by reference hereto. In this case of implementations, the quantum state is defined by the phase of the single-photon. In the QC emitter, this phase can be changed from one photon to another with the use of a phase modulator. Furthermore, a similar phase modulator is used in the QC receiver for the choice of the measurement basis for the analysis of the quantum state sent by the emitter. The authors of those attacks purport to be able to measure the phase value applied by the phase modulator by sending bright light into the QC system through the quantum channel and analyzing a portion of the light coming back from this QC device. The demonstrations have been performed mainly on the QC emitter, but can, in theory, also be performed on the QC receiver. By knowing the phase value used for encoding the bit value—in the case of an attack on the emitter, an eavesdropper may be able to gain the needed information to know the final secret key. By knowing the phase value used for measuring the quantum state—in the case of an attack on the receiver, depending on the QC protocol which is used— e.g. SARG described by V Scarani, A Acin, G Ribordy and N Gisin in Physical Review Letters vol. 92, 057901 (2004), the content of the technical disclosure of which is incorporated herein by reference thereto—, an eavesdropper may be able to gain all the needed information to know the final secret key. When a Trojan horse attack is performed on the receiver, one expects the attack to be easily detected thanks to the single-photon detectors which are very sensitive light detectors. However, in order to reduce the impact of the detection noise, the single-photon detectors are not continuously active or the detections are taken into account only during specified time periods of acceptance. If the Trojan horse attack is performed when the detectors are not active or outside of those acceptance periods, the attack does not generate any detection recorded by the receiver. Hence, the QC system is not able to detect this Trojan horse attack. E.g. in the case of phase coding implementation, a Trojan horse attack can be performed during the whole time when the state of the modulator remains in the state of the modulation of the quantum state. For practical reasons, the time when the state of the modulator is set in the state of modulation of the quantum state is quite large compare to the time during which SPDs are active or detections are accepted.

To summarize, Quantum Cryptography is a powerful method to exchange secret keys in a secure way. Theoretical security proofs of such a technology have been established considering perfect models. However, because practical implementations of QC are slightly different from the considered ideal models, it may be possible that, at least theoretically, side-channel attacks could be made. Two recent examples of these side-channel attacks are based on sending intense light into the QC receiver through the quantum channel. The result of one example is the purported total control of single-photon detectors. The result of the second example is the purported knowledge on the quantum state used for the coding of the bit value, or the measurement basis chosen for the quantum analysis.

What is needed therefore, to eliminate these security loopholes, is a system and method which help reveal these kinds of attacks.

SUMMARY OF THE INVENTION

An apparatus and method are provided which detects attacks based on the sending of bright light into QC devices containing single-photon detectors through the quantum channel. This invention protects QC system against at least two classes of known attacks: attempting to take control of the single-photon detector of a quantum cryptography apparatus, and attempting to know either the quantum state chosen by the emitter or the measurement basis chosen for the quantum state analysis by the receiver, known as Trojan horse attacks. This invention relies on the combination of a random change of a setting parameter of these single-photon detectors and the comparison of the measured detection probability values for each setting parameter with the expected detection probability values. The modified setting parameter of the single-photon detector can be its efficiency and/or its timing of activation, for example.

The primary object of the invention is to allow detection of attacks performed on the single-photon detectors of QC systems. Those attacks are purported to allow an eavesdropper to gain total control on the SPDs of the apparatus.

In one embodiment, the system and method of the invention detects such attacks by changing the value of SPD's efficiency randomly, and checking the different detection probability values after the data acquisition.

The secondary object of the invention is to allow detection of Trojan horse type attacks performed on QC devices containing at least one single-photon detector. Those attacks are purported to allow an eavesdropper to gain information on the quantum state chosen by the emitter, or the measurement basis chosen by the receiver.

In another embodiment, the system and method of the invention detects such attacks by changing the duration of SPD's activation timing randomly, and checking the different detection probability values after the data acquisition.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

FIG. 9 shows graphs of exemplary signal processing leading to an alarm in a case where the countermeasure is performed against an attack performed on the SPDs of a QC apparatus (in this case, the action of the alarm subsystem 400 is to suppress some of the activation gates).

FIG. 10 shows an example of signal processing leading to an alarm in a case where the countermeasure is performed against a Trojan horse attack performed on a QC apparatus containing at least one single-photon detector (in this case, the action of the alarm subsystem 400 is to vary the width of the activation gates from one gate to another).

DETAILED DESCRIPTION OF THE PREFERRED EMBODIMENT(S)

Figure 1:
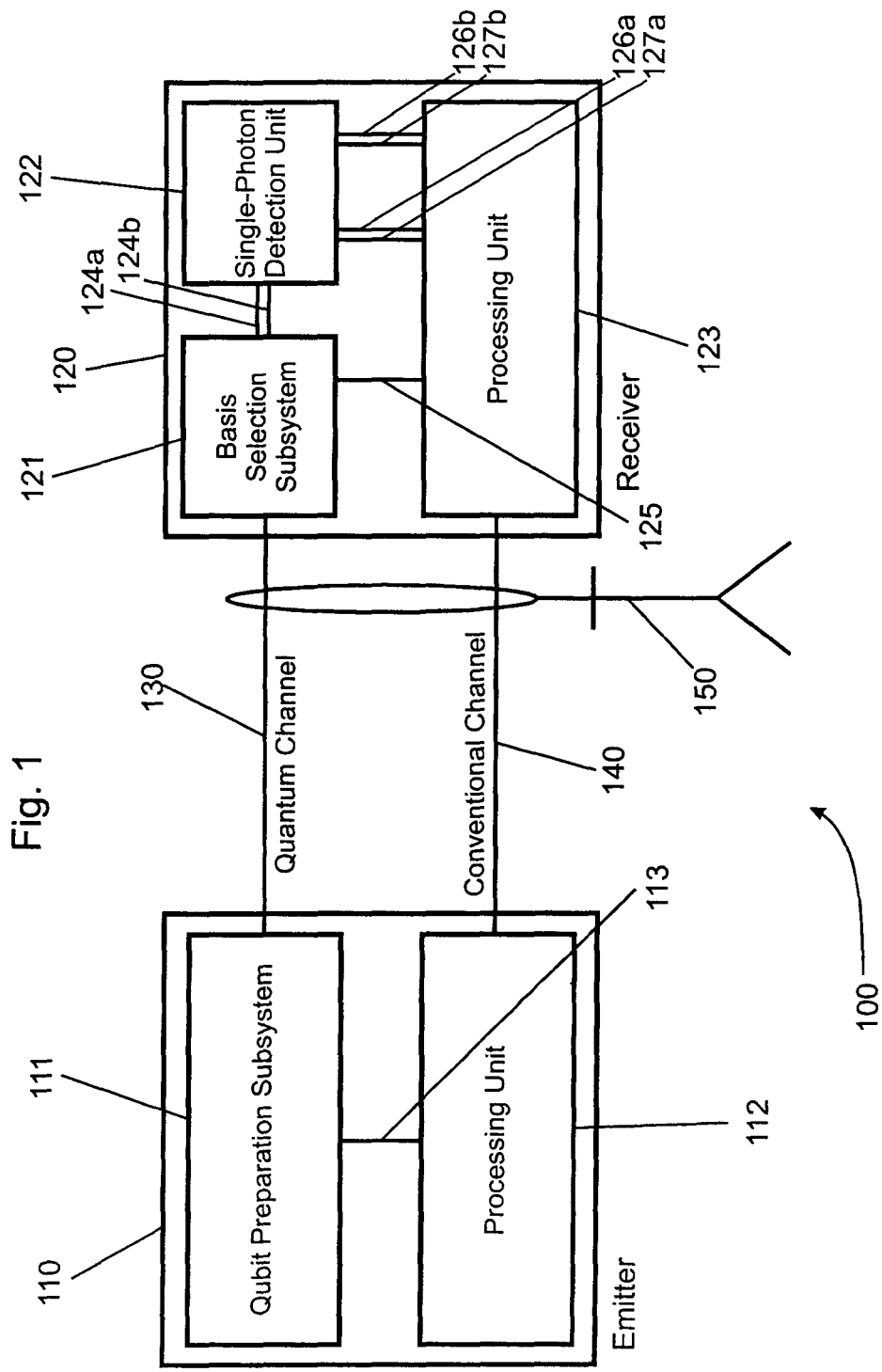
FIG. 1 is a schematic diagram of a quantum cryptography apparatus comprising one embodiment of the invention.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

As discussed above, some researchers have demonstrated that it may be possible to take control of single-photon detectors (SPDs) based on Si-APDs by blinding them with intense light. Attack demonstrations on other single-photon detection techniques may be demonstrated soon. This possible total control of SPDs implies a reduction of the security of current QC systems.

It is believed impossible to tell the difference between an electrical pulse due to the detection of a single-photon and one due to an attack. Therefore, one must assume that all the electrical pulses are potential detections. Once a large number of detections have been recorded, the detection set is processed to extract a secret key. During this processing, the probability of detection is measured and compared to the expected probability of detection. If the two probability values are not similar—their difference should be smaller than a given threshold value—, the data is not used for secret key distillation, but is discarded. This condition placed on the probability of detection is very important in the security proofs of QC. Unfortunately, if an eavesdropper takes control of the SPDs, he can know the expected detection probability and then perform his attack in such a way that the measured detection probability is similar to the expected one. Therefore, to detect this attack, the receiver introduces some uncertainty about the way the eavesdropper needs to proceed. Indeed, if the receiver can switch between at least two SPD efficiency values randomly and sort the data by efficiency values, there will be one detection probability value associated with each efficiency value. Because the eavesdropper does not know the value of the efficiency before performing his attack (the choice of the efficiency value may, for example, be made once the optical pulse has entered into the receiver device), he does not know which probability of detection he has to simulate. Hence, the attack can be detected by checking the different detection probability values. If all the different measured detection probabilities match the corresponding expected detection probability values, we can be sure that the eavesdropper has not taken control of the single-photon detectors.

Using single-photon detection techniques, it is possible to adjust the efficiency of the detector by adjusting some physical parameters. To change the efficiency of APD-based, single-photon detectors working in free-running mode, one can tune the bias voltage applied on the APD. For example, if we consider an APD with a bias voltage of 420 volts, the efficiency of the detector around 800 nanometers goes from 70% to 35% if the bias voltage goes from 440 volts to 430 volts. The efficiency of the APD based SPDs working in gated mode can be changed by tuning either the bias voltage or the amplitude of electrical gates. In the case of the combination of an APD based SPD with a wavelength conversion process, the efficiency of the detector can be changed by changing either the efficiency of the APD based SPD or the efficiency of the non linear process. The efficiency of the non linear process can be tuned by varying the pump laser power—escort photon source—or the phase-matching conditions in the medium—for example, this can be done by changing the temperature of the medium. The efficiency of detectors based on superconductivity can be adjusted by changing the temperature of the superconductivity device or the current going through it.

Referring first to FIG. 1, the system in which the invention is used is shown. A quantum cryptography apparatus 100 comprises an emitter station 110 and a receiver station 120 connected by a quantum channel 130 and another channel 140. The quantum channel 130, which is used for transmitting quantum particles for the emitter station 110 to the receiver station 120, can, for example, be a dedicated optical fiber or a channel in a wavelength division multiplexing optical communication system. The other channel 140, which is used for the communication between the emitter station 110 and the receiver station 120, can, for example, be the Internet, a second optical fiber carrying bright optical pulses, or theoretically, any other means of data communication between two points in space. The apparatus 100 is therefore configured such that an eavesdropper 150 having access to the quantum channel 130 cannot obtain full knowledge of the bit sequence encoded on quantum particles transmitted by the emitter station 110 without introducing errors in the said bit sequence with a non-zero probability. In other words, the emitter and receiver stations 110 and 120 collaborate, by communicating over the other channel 140 to produce from the bit sequence transmitted by the emitter 110 and the bit sequence recorded by the receiver 120 after transmission of quantum particles over the quantum channel 130, a secret unknown to the eavesdropper 150.

The emitter station 110 comprises a processing unit 112 and a qubit (quantum bit, a bit value carried by a quantum particle, in this case, a photon) preparation subsystem 111. It is connected to the other channel 140, which allows it to communicate with the receiver station 120. The processing unit 112 can for example be a computer having a memory, input/output ports, a central processor managing inputs, which operates on such to produce desired outputs, as well as a data transmission and communications mechanism permitting communications with other components of the apparatus. The qubit preparation subsystem 111 is used for generating qubits sequence. A qubit is described by a two-level system. The qubit preparation subsystem 111 can, in the case of implementation of BB84 using phase coding as proposed by Paul Townsend et al. in "Single-photon interference in a 10 km long optical fiber interferometer", Supra., comprise a pulsed laser source sending a sequence of optical pulses, an imbalanced Mach-Zehnder interferometer used for generating a temporally separated pair of optical pulses, a phase modulator included in one of the two arms of the interferometer and used for tuning the phase of one pulse of the pair compared to the second one, and a variable optical attenuator used for attenuating the beam to set the mean photon number per pulse to an appropriate level. The devices which are comprised in the qubit preparation subsystem 111 can be different from the ones given above depending on the kinds of protocols, coding schemes and implementations which are considered. The processing unit 112 is connected to the qubit preparation subsystem 111 by the transmission line 113, which allows data transfer between the two subsystems. The transmission line 113 can for example be made up of wires or cables carrying electronic signals. After preparing the quantum bits, the qubit preparation subsystem 111 launches them into the quantum channel 130.

The receiver station 120 comprises a processing unit 123, a basis setting subsystem 121, and a single-photon detection unit 122. The processing unit 123 can, for example, be a computer having a memory, input/output ports, a central processor managing inputs which operates on such to produce desired outputs, as well as a data transmission and communications mechanism permitting communications with other components of the apparatus. The receiver station 120 is connected to the other channel 140, which allows it to communicate with the emitter station 110. The basis setting subsystem 121 selects the measurement basis which will be used for analyzing the qubit. It has one input port and one or several output ports. The input port of the basis setting subsystem 121 is connected to the quantum channel 130. Depending on the result of the qubit analysis in the basis set by the subsystem 121, the single photon will go out from the basis setting subsystem 121 through one or another of its output ports. In order to complete the qubit measurement, a single-photon detection unit 122 is connected to the output ports of the basis setting subsystem 121 via the optical connection 124. The optical connection 124 may consist of one or several optical fibers. The number of these optical fibers depends on the number of single-photon detectors in the single-photon detection unit 122. In FIG. 1, an example with two single-photon detectors in the single-photon detection unit 122 is shown. In the case of implementation of BB84 using phase coding as proposed by Paul Townsend et al. in "Single-photon interference in a 10 km long optical fiber interferometer", Supra, the basis setting subsystem 121 can comprise an imbalanced interferometer with a path length difference corresponding to the one of the imbalanced interferometer in the emitter station 110 and a phase modulator in one of the two arms of the interferometer to choose the basis for the qubit analysis. The devices which are comprised in the basis setting subsystem 121 can be different from the ones given above depending on the kinds of protocols, coding schemes and implementations which are considered. The processing unit 123 is connected to the basis setting subsystem 121 by the transmission line 125, which allows it to send the basis value that the basis setting subsystem 121 has to select. The transmission line 125 can, for example, be made up of wires or cables carrying electronic signals. The single-photon detection unit 122 is connected to the processing unit 123 via the transmission lines 126 and 127. The transmission line 126 is used by the processing unit 123 to send one or several setting parameter values to the single-photon detection unit 122. The transmission line 127 is used for recording the outcomes of the single-photon detection unit 122. The transmission lines 126 and 127 can, for example, be made up of wires or cables carrying electronic signals. The number of these wires or cables depends on the number of single-photon detectors in the single-photon detection unit 122. In FIG. 1, as described above, an embodiment with two single-photon detectors in the single-photon detection unit 122 is shown.

Figure 2:
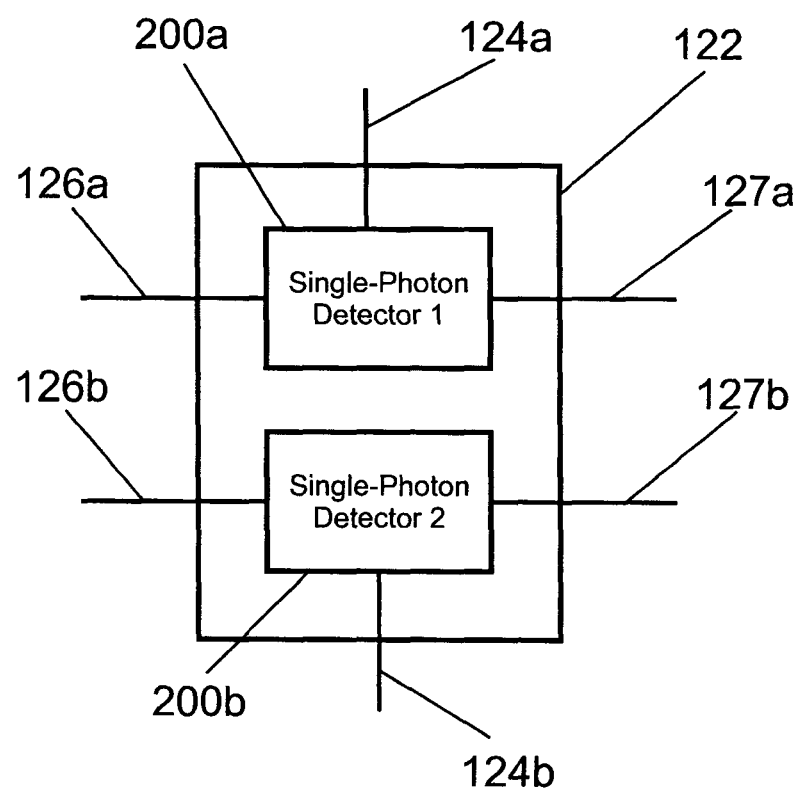
FIG. 2 is a schematic diagram of a single-photon detection unit comprising one embodiment of the invention.

Referring now to FIG. 2, one embodiment of the single-photon detection unit 122 comprises one or several single-photon detectors 200. In FIG. 2, an embodiment with two single-photon detectors 200 is given. Depending on the single-photon technology which is used, the single-photon detector 200 can comprise different devices. Different possibilities will be described in the following paragraphs. The single-photon detection technologies based on APD, wavelength conversion process, and superconducting material are called 200-1, 200-2, and 200-3 respectively. Each time the notation 200 is used for the single photon detector, it means that the statement works for the three kinds of single photon detection technologies. Each single-photon detector 200 is linked to the basis setting subsystem 121 via the optical connection 124. Each single-photon detector 200 is linked to the processing unit 123 via the transmission lines 126 and 127.

Figure 3:
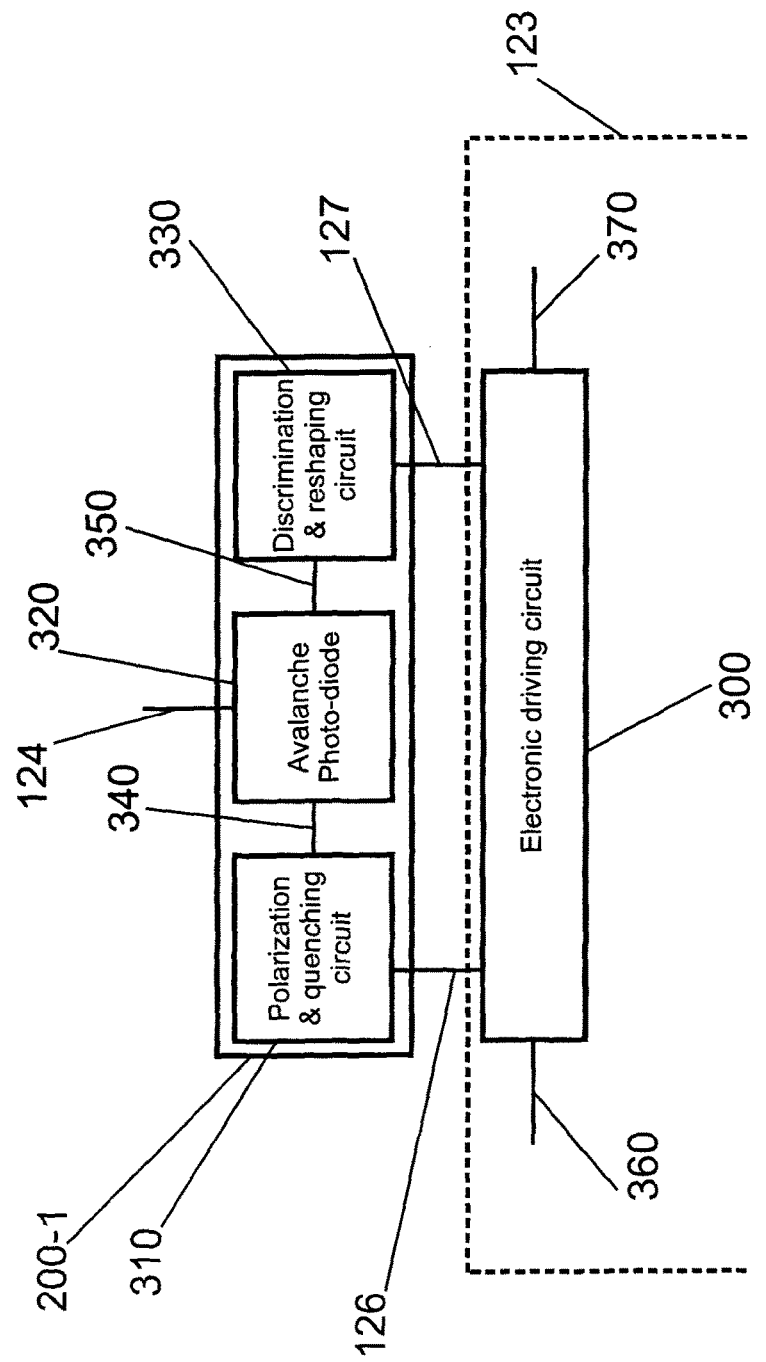
FIG. 3 is a schematic diagram of a single-photon detector based on APD of the prior art.

Referring now to FIG. 3, one possible embodiment of the single-photon detector 200 and the processing unit 123 of the prior art can be seen in the case in which the single-photon detector 200 is an APD based single photon detector 200-1. The part of the processing unit 123 dealing with the single-photon detector 200 is the electronic driving circuit 300 which consists of one or several components of the processing unit 123. The electronic driving circuit 300 can, for example, be included in a Field-programmable gate array. The electronic driving circuit 300 receives inputs from the rest of the processing unit through the transmission line 360 and sends outputs to it through the transmission line 370. One of the inputs sent to the electronic driving circuit 300 is the efficiency of the single-photon detector 200, and the time when it needs to be active. The outputs sent through the transmission line 370 is the timing of the detections registered by the single-photon detector 200. The transmission lines 360 and 370 can, for example, be made up of wires or cables carrying electronic signals. The single-photon detector 200-1 comprises an APD 320 which is used in Geiger mode (see details in reference S. Cova, M Ghioni, A. Lacaita, C. Samori, and F. Zappa in Applied Optics vol. 35 (1996), incorporated by reference above) to detect single photons, a polarization and quenching circuit 310 used for setting the APD 320 in Geiger mode and quenching the avalanche once a photon has been detected, and a discrimination and reshaping circuit 330 used for discriminating and reshaping the output signal of the APD 320 in order to produce electrical signals which are adapted to the electronic driving circuit 300. The APD can, for example, be made of silicon (Si) or III-V semiconductor material, such as InP/InGaAs. Depending on the kind of semiconductor material which is used, the APD 320 can work either in free-running or gated modes. The polarization and quenching circuit 310 can comprise several electronic components assembled on a board to make the APD run in one of the two possible working modes. The discrimination and reshaping circuit 330 can, for example, comprise a discriminator of electronic pulses and a converter of logical electrical signals. The APD 320 is connected to the basis setting subsystem 121 by the optical connection 124. The APD 320 is linked to the polarization and quenching circuit 310 via the transmission line 340. If the single-photon detector 200-1 is working in free-running mode, the transmission line 340 is used to apply the appropriate bias voltage value on the APD 320. If the single-photon detector 200-1 is working in gated mode, the transmission line 340 is used for applying the appropriate bias voltage value on the APD 320 and the activation gate at the appropriate time and with the appropriate amplitude and width. The transmission line 340 can, for example, be made up of wires or cables carrying electronic signals. The APD 320 is linked to the discrimination and reshaping circuit 330 via the transmission line 350. The transmission line 350 is used for transmitting the output electronic signal of the APD 320 to the discrimination and reshaping circuit 330. The transmission line 350 can, for example, be made up of wires or cables carrying electronic signals. The polarization and quenching circuit 310 is linked to the electronic driving circuit 300 via the transmission line 126. When the single-photon detector 200-1 is working in free-running mode, the transmission line 126 is used by the electronic driving circuit 300 for transmitting the setting parameter values (for example, bias voltage value) corresponding to the efficiency value transmitted to it through the transmission line 360. When the single-photon detector 200-1 is working in gated mode, the transmission line 126 is used for transmitting the setting parameter values (for example, bias voltage value and activation gates) corresponding to the efficiency value and/or the time of activation transmitted to it through the transmission line 360. The conversion between the values sent by the processing unit 123 to the electronic driving circuit 300 (for example, the efficiency and/or activation timing) and the values sent by the electronic driving circuit 300 to the polarization and quenching circuit 310 (for example, the bias voltage) can be made using conversion tables stored in a memory of the electronic driving circuit 300 for example. The discrimination and reshaping circuit 330 is connected to the electronic driving circuit 300 via the transmission line 127. This transmission line 127 is used to transmit the outcomes of the discrimination and reshaping circuit 330 to the electronic driving circuit 300. The transmission lines 126 and 127 can, for example, be made up of wires or cables carrying electronic signals.

To summarize, the electronic driving circuit 300 receives the efficiency and/or time of activation values for the single-photon detector 200 from other subsystems of the processing unit 123. The electronic driving circuit 300 processes these values and sends the appropriate setting parameter values (for example, bias voltage and timing of activation) to the polarization and quenching circuit 310 via the transmission line 126. The polarization and quenching circuit 310 applies the received values onto the APD 320. If the APD 320 detects a photon, it sends an electrical output signal to the discrimination and reshaping circuit 330. This circuit discriminates the electrical signal from noise and reshapes it in order to be recognized by the electronic driving circuit 300. The output signal from the discrimination and reshaping circuit 330 is sent to the electronic driving circuit 300 via the transmission line 127. The electronic driving circuit 300 pre-processes this signal and sends the time of the detection to the rest of the processing unit 123 for further processing.

Figure 4:
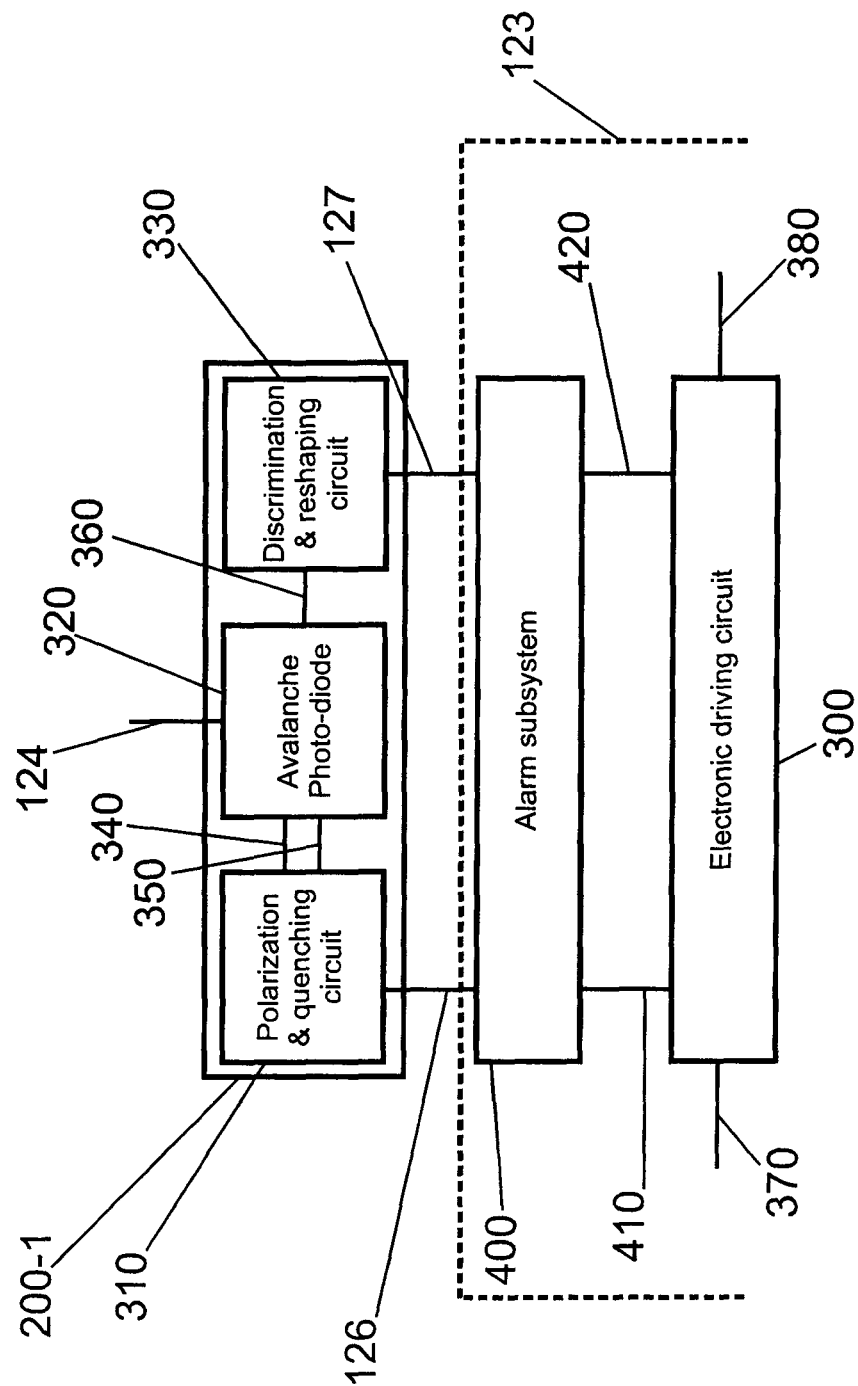
FIG. 4 is a schematic diagram of a single-photon detector based on APD with one embodiment of the invention.

Referring now to FIG. 4, one embodiment of the single-photon detector 200 and the processing unit 123 of the invention, in the case where the single-photon detector 200 is an APD based single-photon detector 200-1, an alarm subsystem 400 is disposed in between the single-photon detector 200-1 and the electronic driving circuit 300. This alarm subsystem 400 can be inserted inside the processing unit 123—as it is shown in FIG. 4—or added outside. If the alarm subsystem 400 is inserted in the processing unit 123, it may be made up of one or several components of this processing unit 123. The alarm subsystem 400 can be included for example in a Field-programmable gate array. If the alarm subsystem 400 is not inserted in the processing unit 123, it can, for example, be a computer having a memory, input/output ports, a central processor managing inputs which operate on such to produce desired outputs, as well as a data transmission and a communications mechanism permitting communications with other components of the apparatus. The alarm subsystem 400 is used for randomly modifying the parameters sent to the polarization and quenching circuit 310 (e.g., bias voltage, activation gates). On the other hand, in FIG. 3, the electronic driving circuit 300 is used for converting the setting parameters sent by the processing unit 123—efficiency and/or activation timing—into setting parameter values adapted to the polarization and quenching circuit 310, the electronic driving circuit 300 does not convert the setting parameters sent by the processing unit 123 in FIG. 4. The electronic driving circuit 300 forwards these parameters to the alarm subsystem 400 without modification. Via the transmission line 410, the alarm subsystem 400 receives these parameters from the electronic driving circuit 300, chosen for the settings of the polarization and quenching circuit 310. The transmission line 410 can, for example, be made up of wires or cables carrying electronic signals. The alarm subsystem 400 chooses randomly to send the parameters—bias voltage, activation gates (amplitude, time of generation or width of this gate)—corresponding to the parameter values received from the electronic driving circuit 300 or other parameter values from a list stored in one of its memory to the polarization and quenching circuit 310. The alarm subsystem 400 can modify the detection efficiency, the activation timing, or both at the same time. It will randomly choose to change, or not, the parameter values sent by the electronic circuit 300, based on the inputs of a random number generator included in the alarm subsystem 400 (e.g., a pseudo-random number generator provided by its PC may be used for this purpose). The probability that the alarm subsystem 400 sends the setting parameter values corresponding to the parameter values it received from the electronic circuit driving 300 can be tuned from 0 to 1 depending on the performances expected by the user. The alarm subsystem 400 can act on the detection efficiency either independently for each expected incoming qubit or by groups of incoming qubits. When the alarm subsystem 400 does not send the setting parameter values corresponding to the parameter values it received from the electronic driving circuit 300, it chooses other parameter values in a list of one or several parameters values. If the list contains more than one value, the alarm subsystem 400 will randomly choose between those different parameter values based on the inputs of a random number generator included in its components (e.g., a pseudo-random number generator provided by its PC). Once the parameters have been chosen, the alarm subsystem 400 converts them into the corresponding setting parameter values adapted to the polarization and quenching circuit 310. The selection probability can be equal for all the parameters of the list or different. This conversion can be done using conversion tables stored in a memory of the alarm subsystem 400. Then, the alarm subsystem 400 sends the setting parameters (for example, bias voltage and activation gate) to the polarization and quenching circuit 310 via the transmission line 126.

Figure 8:
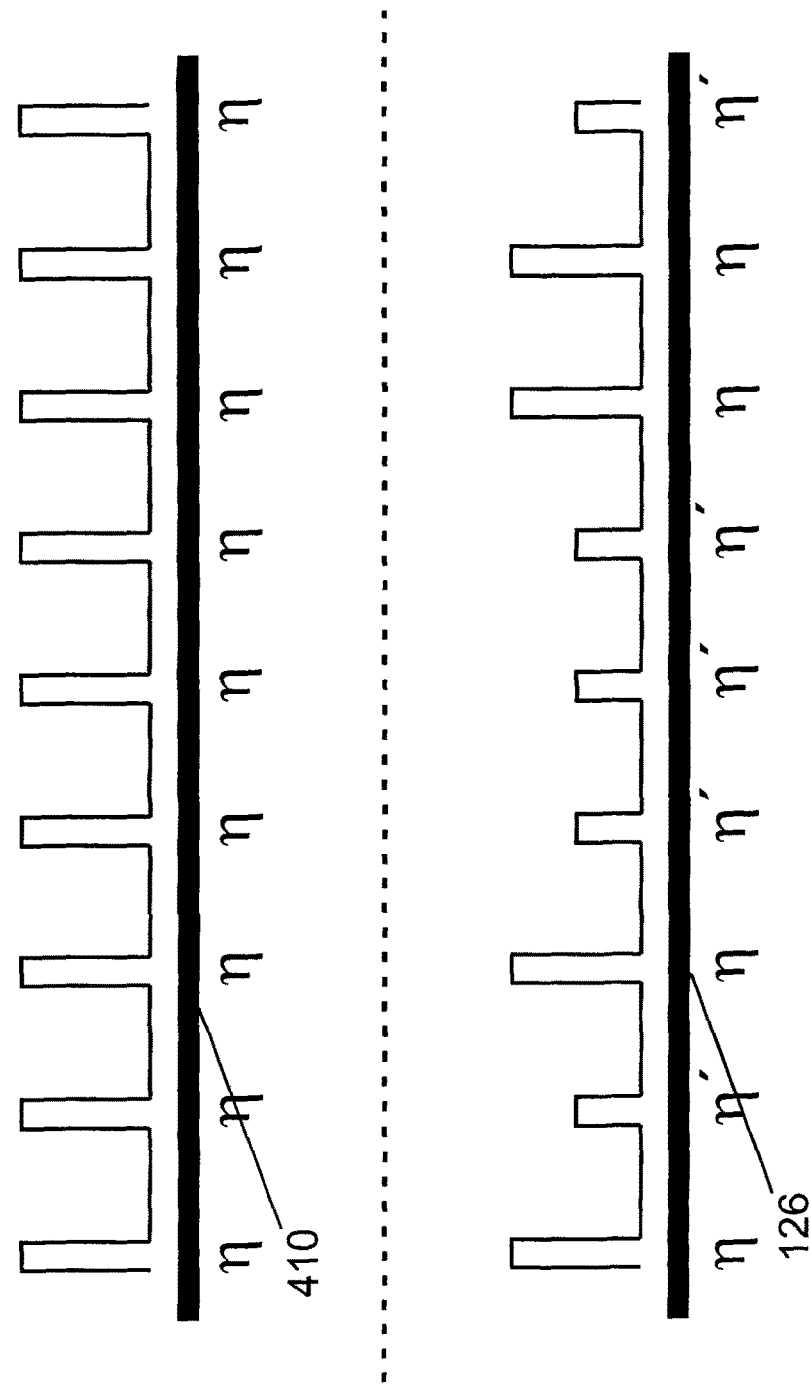
FIG. 8 shows the signals propagating through the transmission lines 410 and 126 where for each expected incoming qubit, the efficiency and the associated activation gate amplitude are represented.

Referring to FIG. 8, the action of the alarm subsystem 400, is shown in which the signals propagating through the transmission lines 410 and 126, are presented. In the case shown in FIG. 8, the efficiency is the only setting parameter value considered and the amplitude of the activation gates is the only parameter value considered. For both transmission lines, both values—efficiency and the associated amplitude of gates—are represented even if only one of those two value types goes through each transmission line. The alarm subsystem 400 is always receiving the same efficiency value η at each activation time of the detectors from the electronic driving circuit 300. After the internal processing for choosing efficiency values which will be applied on the single-photon detector 200-1, the alarm subsystem 400 sends modified activation gate amplitudes through the transmission line 126. In this example, one considers that the alarm subsystem randomly chooses between two different efficiency values η and η' with a probability of choice of 50%. As represented in FIG. 8, the amplitude of the activation gates sent by the alarm subsystem 400 can take two values corresponding to two different efficiency values which are chosen randomly. The single-photon detector 200-1 works in the same way as shown in FIG. 3. Namely, it sends to the alarm subsystem 400 some outcomes—time of detection of the single photon detector 200-1—via the transmission line 127. Via the transmission line 420, these outcomes are forwarded by the alarm subsystem 400 to the electronic driving circuit 300 with the efficiency value and/or gate activation parameters corresponding to the setting parameter values—bias voltage, amplitude of gate, timing of gate (time of generation and width)—sent by the alarm subsystem 400 to the polarization and quenching circuit 310 for each outcome. The transmission line 420 can, for example, be made up of wires or cables carrying electronic signals. This data—outcomes of 200-1 and the corresponding setting parameter values sent to the polarization and quenching circuit 310—is then sent by the electronic driving circuit 300 to the processing unit 123 and processed by the processing unit 123 in order to detect a possible attack made on the single-photon detection unit 122 by an eavesdropper 150. The processing done to detect attacks on the single-photon detector 200-1 includes essentially three steps. In step one, the values received by the processing unit 123 on the transmission line 127 are grouped according to the setting parameter values passed by the alarm subsystem 400. In step two, a detection probability for each possible setting parameter value is computed from the data. These are called the measured detection probabilities. In step three, those computed detection efficiency values are compared to the expected ones. If there is a mismatch between these values, the processing unit 123 sends an alarm revealing the attack attempt by the eavesdropper 150. Because the measured detection probability values are statistical variables, one considers that the measured values match the expected values if the measured ones are in a preset interval around the expected values. In order to detect an attack performed on the single-photon detectors of QC systems, which is purported to allow an eavesdropper to gain total control on the SPDs of the apparatus, the alarm subsystem 400 changes randomly the efficiency value of the single-photon detector. This can be done by changing the bias voltage and/or the amplitude of the activation gate. In order to detect a Trojan horse attack performed on the receiver of a QC device, which is purported to allow an eavesdropper to gain information on the measurement basis chosen by the receiver. The alarm subsystem 400 changes randomly the timing of activation of the single-photon detector. This can be done by changing the timing (time of generation and/or width) of the activation gate, or by changing the timing (time of generation and/or width) of the acceptance time period of the detections. In the following lines, the term 'activation timing' will refer to the timing of the activation of the detector. The term 'activation gate timing' will refer to the timing of the activation gate applied on the detector. And, the term 'acceptance timing' will refer to the timing of the acceptance time period of the detections. All the three timings are defined by a time of generation and a width. By tuning timing, we mean tuning the time of generation and/or the width of the signal related to the considered timing independently. A detector working in free-running mode will be considered as active only during the periods when the acceptance of the detections is active. A detector working in gated mode will be considered as active only during the periods when the activation gate is applied and the acceptance of the detections is active.

Referring now to FIG. 9, a first simple case of the signal processing, in the event of countermeasure against an attack performed on the SPDs of a QC apparatus, is illustrated. In this simple case, the efficiency value of the single-photon detector 200-1 working in gated mode is changed by suppressing the activation gate sent by the electronic driving circuit 300. The bias voltage applied on the APD remains constant during all the process. This means that the alarm subsystem 400 chooses between two efficiency values: η and 0. In FIG. 9, the gate signal sent by the electronic driving circuit 300 corresponds to the activation gate timing sent by the electronic driving circuit 300. For simplicity, in this example we will consider that the acceptance timing corresponds to the activation timing. Hence, the activation timing is equal to the activation gate timing too. The alarm subsystem 400 randomly chooses either to send this activation gate to the single-photon detector 200-1 or to suppress it. This processing leads to the gate signal sent by the alarm subsystem 400 as represented in FIG. 9. Then, the alarm subsystem 400 waits for the detection signal sent by the single-photon detector 200-1. The alarm subsystem 400 forwards then the efficiency information and the detection signal sent by 200-1 to the electronic driving circuit 300. Those two signals are then processed by the processing unit 123. The processing unit 123 generates the alarm signal as follows: if there is one detection at a time when the gate has been suppressed by the alarm circuit 400, the alarm signal is set to the bit value 1. Indeed, because the APD was not in Geiger mode at that time, the only way to generate a detection signal is to send bright light which should not exist in a proper implementation of QC.

Referring to FIG. 10, a second simple case of the signal processing, in the event of countermeasure against a Trojan horse attack, is illustrated. In this simple case, the activation gate timing value of the single-photon detector 200-1 working in gated mode is changed by randomly changing the width of the activation gate sent by the electronic driving circuit 300. The acceptance timing is equal to the activation gate timing, so the activation timing is equal to the acceptance gate timing in this example too. The efficiency of the SPD remains constant during all the process. This means that the alarm subsystem 400 chooses between two gate width values: $\tau_1$ and $\tau_2$. The alarm subsystem 400 sends an activation gate to the single-photon detector 200-1 with the chosen width—$\tau_1$ or $\tau_2$. The amplitude of the gate signal sent by the alarm subsystem 400 remains constant from one gate to another. This processing leads to the gate signal sent by the alarm subsystem 400 as represented in FIG. 10. As can be seen in FIG. 10, the width $\tau_2$ is defined as larger than the width of the gates sent to the phase modulator. If a bright pulse is sent during the activation of the phase modulator and the SPDs are activated with activation gate width of $\tau_2$, this bright optical pulse will reach the SPDs when they are active. Hence, the bright optical pulse will generate detections on the SPDs. Then, the alarm subsystem 400 waits for the detection signal sent by the single-photon detector 200-1. The alarm subsystem 400 forwards then the gate signal width information and the detection signal sent by 200-1 to the electronic driving circuit 300. Those two signals are then processed by the processing unit 123. The processing unit 123 generates the alarm signal as follows: after a significant data acquisition (e.g. 1 million detections), the processing unit 123 groups the detections depending on the width value used by the alarm subsystem 400. Then, the processing unit 123 computes the probabilities of detection for the different width values. A probability of detection is equal to the ratio between the number of detections and the number of activation gates. If a Trojan horse attack is performed when the activation gate width is $\tau_2$, detections on the SPDs will be generated each time. Hence, if the two detection probability values (for widths of $\tau_1$ and $\tau_2$) differ by an amount larger than a given threshold value, the processing unit 123 generates the alarm signal. More details of the attack detection process are given in the description of the method 700.

Figure 5:
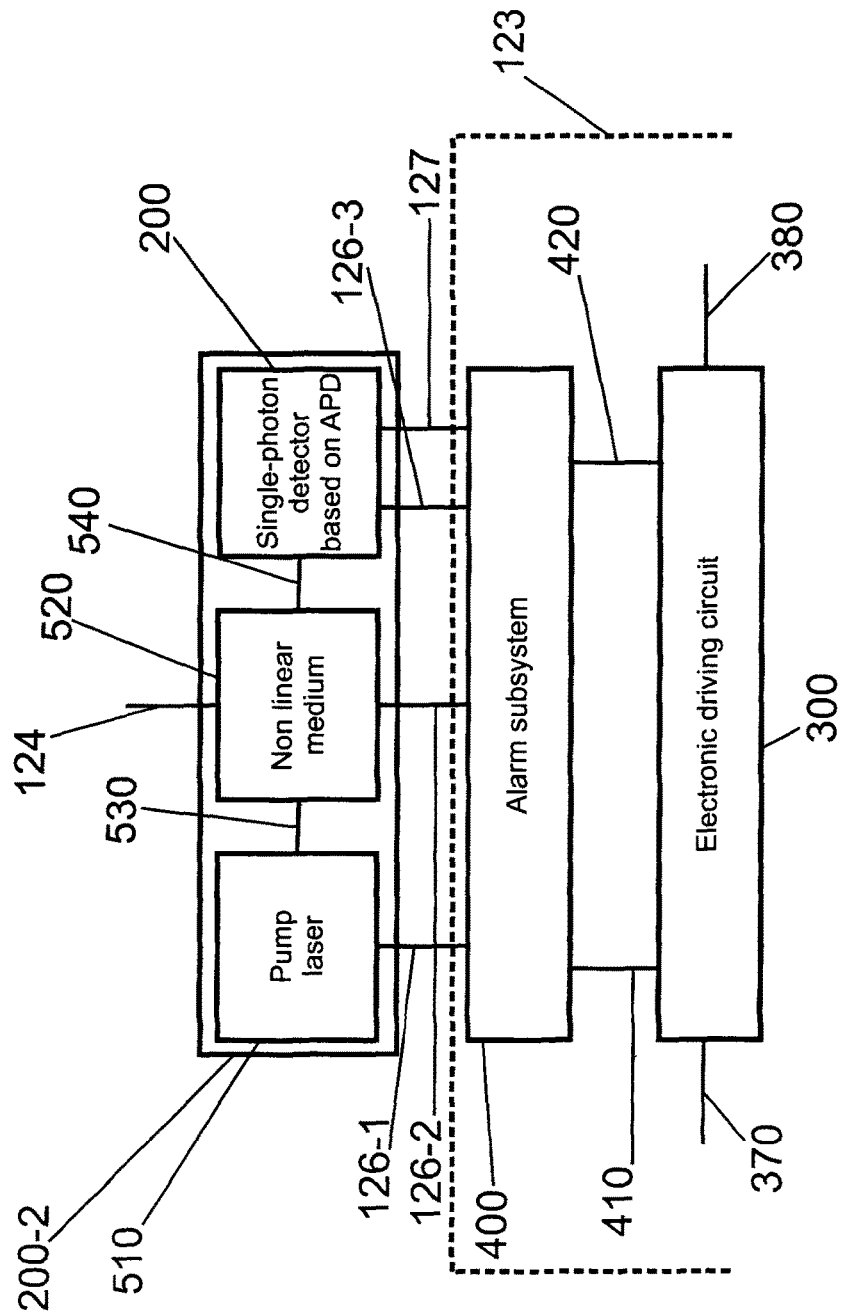
FIG. 5 is a schematic diagram of a single-photon detector based on the combination of a single-photon detector based on APD and a wavelength conversion process with one embodiment of the invention.

Referring now to FIG. 5, one embodiment of the single-photon detector 200 and the processing unit 123 of the invention, in the case where the single-photon detector 200 is an APD based single-photon detector with wavelength conversion process 200-2, shows the alarm subsystem 400 disposed between the single-photon detector 200-2 and the electronic driving circuit 300. The APD based single-photon detector with wavelength conversion process 200-2 (see details in reference A. P. VanDevender and P. G. Kwiat, Journal of Modern Optics vol. 51, p 1433-1445, (2004), incorporated by reference herein) consists of a pump laser 510 used for generating the escort photon, a non-linear medium 520 used for converting the photon arriving from the basis setting subsystem 121 into a photon at a different wavelength, and an APD based single-photon detector 200-1 used for detecting the photon generated in the non-linear medium 520. By convention, in the following description, the photon arriving from the basis setting subsystem 121 will be called the near-infrared photon, and the photon generated in the non-linear medium 520 will be called the visible photon.

Referring again to FIG. 1, the transmission line 126 has been defined as the transmission line used by the processing unit 123 to send inputs to the single-photon detection unit 122. In the case of the APD based single-photon detector with wavelength conversion process 200-2, the three units—the pump laser 510, the non-linear medium 520, and the APD based single-photon detector 200-1—require inputs from the processing unit 123. Hence, in order to keep the coherence of notation, the transmission line 126 is split into three transmission lines 126-1, 126-2, and 126-3. The pump laser 510 is linked to the alarm subsystem 400 via the transmission line 126-1. The transmission line 126-1 is used by the alarm subsystem 400 to tune the optical output power of the pump laser 510. The transmission line 126-1 can, for example, be made up of wires or cables carrying electronic signals. The pump laser 510 is connected to the optical link 530. The optical link 530 allows the escort photons emitted by the pump laser 510 to go to the non-linear medium 520. The optical link 530 can be made up, for example, of an optical fiber. The non-linear medium 520 is connected to the optical link 530 and the optical connection 124. The escort photons coming from the pump laser 510 and the near-infrared photon coming from the basis setting subsystem 121 are mixed together to generate a visible photon which is sent through the optical link 540. The optical link 540 can consist for example of an optical fiber. The non-linear medium 520 is linked to the alarm subsystem 400 via the transmission line 126-2. The transmission line 126-2 is used by the alarm subsystem 400 to tune the phase-matching conditions of the non-linear medium 520 (e.g. by changing the temperature of the non-linear medium 520). The transmission line 126-2 can, for example, be made up of wires or cables carrying electronic signals. The APD based single-photon detector 200-1 is connected to the optical link 540, and is used for detecting the visible photon generated in the non-linear medium 520. The single-photon detector 200-1 can work either in the free-running or gated modes. There are the transmission lines 126-3 and 127 between the single-photon detector 200-1 and the alarm subsystem 400. The transmission line 126-3 is used by the alarm subsystem 400 to send the setting parameters needed by the APD based single-photon detector 200-1. The transmission line 126-3 is identical to the transmission line 126 in FIG. 4. To change the efficiency of the detector 200-2, the alarm subsystem 400 has three options: changing the optical power of the pump laser 510; changing the phase-matching conditions in the non-linear medium 520; or changing the efficiency of the APD based single-photon detector 200-1. If the single-photon detector 200-1 works in gated mode, the alarm subsystem 400 can vary the amplitude or the timing of the gates of activation of the APD based single-photon detector 200-1.

As shown in FIG. 5, the alarm subsystem 400 receives the parameters—efficiency and/or activation timing—for the settings of the single-photon detector with wavelength conversion process 200-2 via the transmission line 410. Then, the alarm subsystem 400 converts the efficiency and/or activation timing values it has received into one power setting parameter value for the pump laser 510, one phase-matching condition setting parameter value for the non linear medium 520, and setting parameter values (e.g. bias voltage, and activation gate amplitude and timing) for the APD based single-photon detector 200-1. The relation between these setting parameter values and the efficiency and/or activation timing values can be stored in conversion tables in a memory of the alarm subsystem 400. As shown in FIG. 5, the alarm subsystem 400 randomly chooses to send either the setting parameter values corresponding to the parameter values—efficiency and/or activation timing—it has received from the electronic driving circuit 300 or the ones corresponding to other parameter values from a list stored in its memory to the single-photon detector 200-2. In the memory of the alarm subsystem 400, there are conversion tables giving the settings for the pump laser 510, the non linear medium 520, and the single-photon based on APD 200-1 for different parameter values of the single-photon detector 200-2. The choice of the alarm subsystem 400 for the parameter values to use for the setting of the single-photon detector with wavelength conversion process 200-2 is made with a random number generator. This random number generator is included in the alarm subsystem 400 (which may be a pseudo-random number generator provided by its PC). The single-photon detector based on APD 200-1 sends to the alarm subsystem 400 the recorded events—time of detection of a single photon via the transmission line 127. Via the transmission line 420, these outcomes are forwarded with the parameter values—efficiency and/or activation timing—corresponding to the setting parameter values—pump laser power, phase-matching conditions, and bias voltage—sent by the alarm subsystem 400 to single-photon detector 200-2 for each outcome to the electronic driving circuit 300. This data—outcomes of 200-1 and the corresponding parameter values—is then sent by the electronic driving circuit 300 to the processing unit 123 and processed by the processing unit 123 in order to detect a possible attack performed on the single-photon detection unit 122 by an eavesdropper 150. The details of the attack detection process are given in the method 700 description part.

Figure 6:
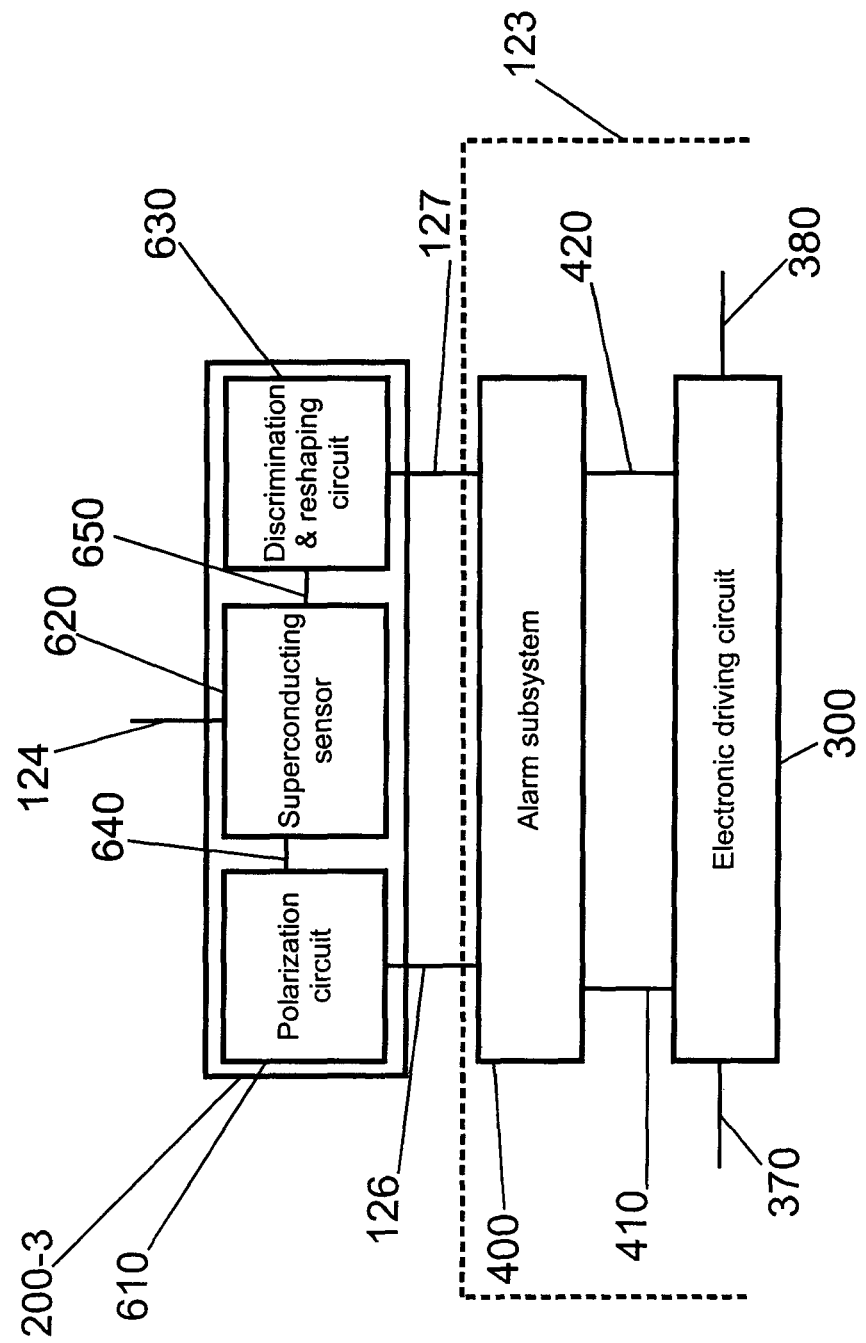
FIG. 6 is a schematic diagram of a single-photon detector based on superconducting material with one embodiment of the invention.

Referring now to FIG. 6, one embodiment of the single-photon detector 200 and the processing unit 123 of the invention, in the case where the single-photon detector 200 is a superconducting material based single-photon detector 200-3 (see details in references thesis report of A. J. Pearlman, "Ultrafast NbN Single-Photon Detectors for Quantum Communications" or D. Rosenberg, A. E. Lita, A. J. Miller, and S. W. Nam in Physical Review A vol. 71 (2005), incorporated by reference herein), involves the insertion of the alarm subsystem 400 in between the single-photon detector 200-3 and the electronic driving circuit 300. The single-photon detector based on superconducting material 200-3 is made up of a polarization circuit 610 used for setting the superconducting sensor 620 in the appropriate working state—setting of temperature and current—, a superconducting sensor 620 used as a sensor to detect the photon arriving from the basis setting subsystem 121, and a discrimination and reshaping circuit 630 used for discriminating the output signal of the superconducting sensor 620 and reshaping it into an electrical signal recognized by the alarm subsystem 400. The polarization circuit 610 can comprise several electrical components assembled on a board. It is linked to the alarm subsystem 400 via the transmission line 126. The transmission line 126 is used by the alarm subsystem 400 to change the setting parameters of the polarization circuit 610—for example, it can be the value of the current propagating through the superconducting sensor 620. The polarization circuit 610 is connected to the transmission line 640. The transmission line 640 allows the polarization circuit 610 to set the superconducting sensor 620 in the appropriate working state. The transmission line 640 can, for example, be made up of wires or cables carrying electronic signals. The superconducting sensor 620 is connected to the transmission line 650 and the optical connection 124. The outcomes of the superconducting sensor 620 are sent to the discrimination and reshaping circuit 630 through the transmission line 650. The transmission line 650 can, for example, be made up of wires or cables carrying electronic signals. The discrimination and reshaping circuit 630 can, for example, comprise a discriminator of electrical pulses and a converter of logical electrical signals. It is connected to the transmission lines 650 and 127. The output signal of the discrimination and reshaping circuit 630 is sent to the alarm subsystem 400 through the transmission line 127.

As shown in FIG. 6 the alarm subsystem 400 receives the parameters—efficiency and/or activation timing—for the settings of the single-photon detector based on superconducting material 200-3 via the transmission line 410. Then, the alarm subsystem 400 converts the efficiency and/or activation values it has received into current and temperature setting parameter values. The relation between these setting parameter values and the efficiency and/or activation timing values can be stored in conversion tables in a memory of the alarm subsystem 400. As shown in FIG. 6, the alarm subsystem 400 can randomly choose to send either the setting parameter values—current, temperature—corresponding to the parameter values—efficiency and/or activation timing—it received from the electronic driving circuit 300 or the ones corresponding to other parameter values from a list stored in its memory to the single-photon detector 200-3. This choice is performed with a random number generator included in its components—e.g., it can be a pseudo-random number generator provided by its PC. Then, via the transmission line 420, the alarm subsystem 400 sends the outcomes of the single-photon detector 200-3 with the parameter values used for the setting of the single-photon detector 200-3 for each outcome to the electronic driving circuit 300. This data is then processed by the processing unit 123 in order to detect a possible attack performed on the single-photon detection unit 122 by an eavesdropper 150. The details of the attack detection process 700 are provided below.

Figure 7:
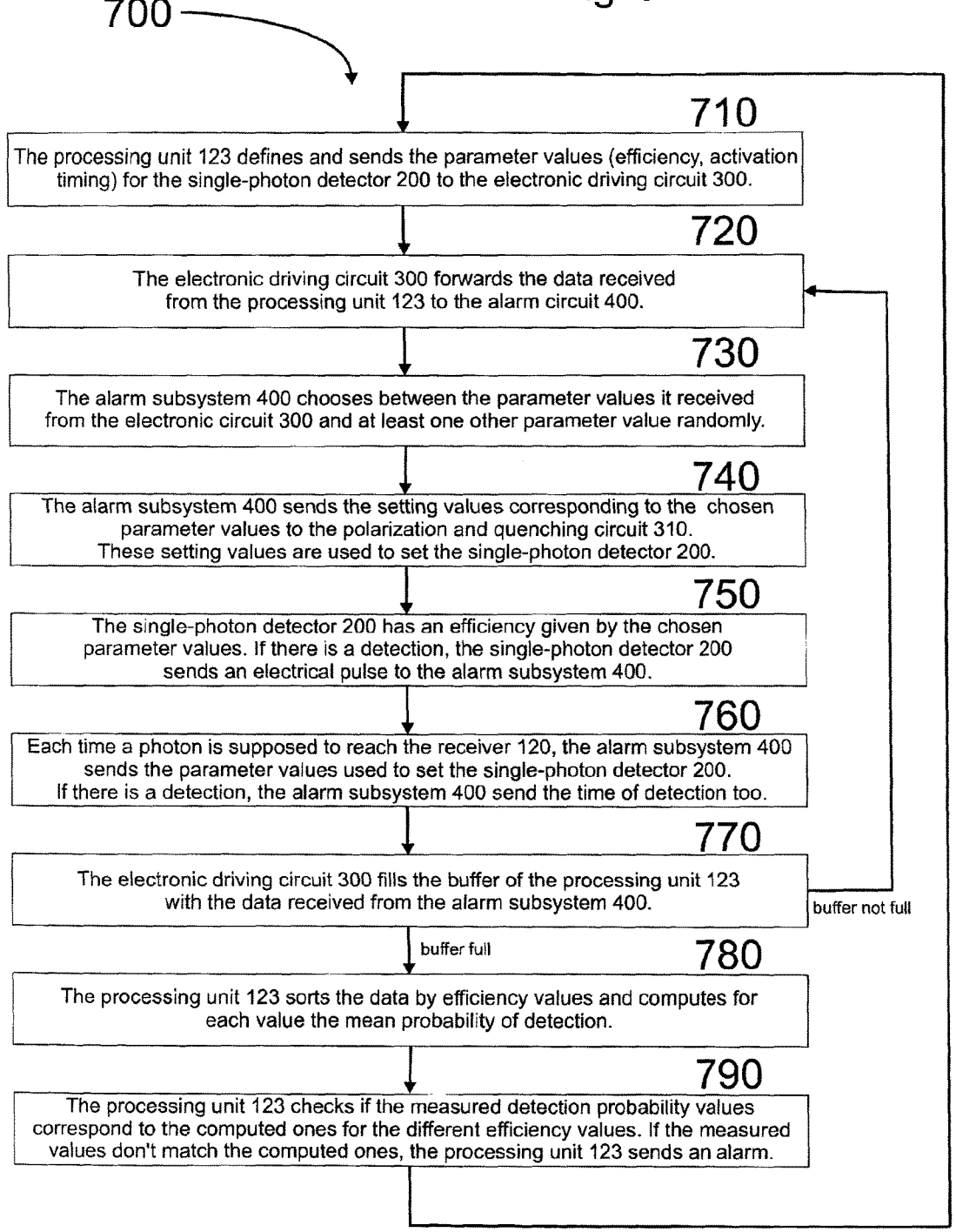
FIG. 7 is a high-level flow chart of the detection acquisition and processing when the invention is included in the quantum cryptography system.

Referring now to FIG. 7, the method 700 for revealing attacks attempting to take control of the single-photon detectors includes the following steps. In the following description, the case of the APD based single-photon detector 200-1 is considered in order to describe how the method 700 works. The method 700 is of course not limited to the case of the APD based single-photon detector 200-1. The method 700 works in the same way for the other single-photon detection technologies presented in this document and equivalents thereof (e.g., the APD based single-photon detector with wavelength conversion process 200-2 and the superconducting material based single-photon detector 200-3).

In a first step 710, the processing unit 123 determines the parameter values of the whole emitter system 120. For example, some parameter values have been defined during calibration in the factory. These values are stored in a memory of the processing unit 123. Depending on the use conditions of the quantum cryptography apparatus 100, the values of these parameters can change. Among these parameter values, the processing unit 123 defines the efficiency of the detector and/or, if the single-photon detection unit 200-1 is working in gated mode, the timing of activation (time of activation and/or width) of the detection unit 200-1. The parameters to set the single-photon unit 200-1 are sent to the electronic driving circuit 300 by the processing unit 123.

In a second step 720, the electronic driving circuit 300 forwards these parameter values (efficiency and/or activation timing) received from the processing unit 123 to the alarm subsystem 400.

In a third step 730, the alarm subsystem 400 randomly chooses, for at least one parameter value (efficiency and/or activation timing), between the value it received from the electronic driving circuit 300 and some other values (at least one other) it has stored in its memory. The alarm subsystem can act on these parameter values either independently for each incoming qubit or by groups of incoming qubits. Then, the alarm subsystem 400 processes these parameters to determine the corresponding setting parameter values that have to be sent to the single-photon detector (200-1, 200-2, or 200-3). The processing can be performed thanks to stored conversion tables.

In a fourth step 740, the alarm subsystem 400 sends the setting parameter values corresponding to the chosen parameter values to the single-photon detector (200-1, 200-2, or 200-3). If the receiver 120 works with a single-photon detector 200-1 based on an APD working in free running mode, the signal sent by the alarm subsystem 400 is the bias voltage applied on the APD. If the receiver 120 works with a single-photon detector 200-1 based on APD working in gated mode, the setting parameter values sent by the alarm subsystem 400 are the bias voltage applied on the APD 320, the time when the activation gate is applied, and the amplitude and width of the activation gate.

In a fifth step 750, the single-photon detector 200 has the efficiency and/or activation timing defined by the set of setting parameter values sent to it by the alarm subsystem 400. The single-photon detector 200 is waiting for the expected single photon coming from the emitter station 110.

In a sixth step 760, if an electrical signal has been received from the single-photon detector 200, the alarm subsystem 400 sends the time of the detection and the setting parameter values (efficiency and/or activation timing) at the time of the detection to the electronic driving circuit 300. If the single-photon detector 200 has not detected the expected photon, the alarm subsystem 400 sends the setting parameter values (efficiency and/or activation timing) at the time of the expected detection to the electronic driving circuit 300. So, the setting parameter values are sent for each photon which has been sent by the emitter station 110 even if the photon has not been detected by the single-photon detector 200.

In a seventh step 770, the electronic driving circuit 300 processes the data sent by the alarm subsystem 400. It stores the time of detection and the corresponding efficiency of the single-photon detector 200 in a buffer of the processing unit 123. The efficiency of the single-photon detector 200 at the time of the detection depends on its intrinsic efficiency and/or the state of the activation gate. E.g., if the intrinsic efficiency is set to 10% but the activation state is off at the time of the detection, then the efficiency of the detector is 0%. In this case, if there is a detection, this means that someone has taken control on the single-photon detector 200-1. In addition to this buffer, the electronic driving circuit 300 manages several counters. Each counter is linked to a possible efficiency value of the single-photon detector. Each time a photon is supposed to arrive from the emitter station 110 when the single-photon detector is set to a given efficiency value, the electronic driving circuit 300 increments the counter associated to this efficiency. If the buffer of the processing unit 123 is not full, the system goes back to the step 720. If the buffer is full, the system goes to the step 780.

In an eighth step 780, the processing unit 123 sorts the data stored in the buffer by efficiency and/or activation timing values and computes for each efficiency and/or activation timing value the measured probability of detection. The measured probability of detection is defined as the ratio between the number of detections when the detector is set at a given efficiency and/or given activation timing and the number of times when a photon is supposed to reach the single-photon unit 122 and the single-photon unit 122 is set in this given efficiency and/or given activation timing (this number is equal to the counter associated with the considered efficiency and/or considered activation timing).

In a ninth step 790, the processing unit 123 checks if the measured detection probability values correspond to the computed ones for the different efficiency and/or activation timing values. If there is a mismatch between the measured detection probability values and the computed ones, the processing unit 123 sends an alarm and stops secret key exchange. Otherwise, the quantum cryptography emitter 120 loops back to step 710.

Notice that, in general, only the receiver subsystem 120 of the quantum cryptography apparatus 100 contains at least one single-photon detector 122. The emitter 110 of the quantum cryptography system does not need, in general, any single-photon detector. However, the emitter 110 is also sensitive to active attacks based on injection of bright light through the quantum channel (e.g. a Trojan horse attack allowing the eavesdropper to know the qubit value sent by the emitter). If a single-photon detector 122 is included in the emitter station 110, it is possible to use the apparatus and method described below to detect the active attacks performed on the emitter of the quantum cryptography apparatus.

Moreover, the system contemplates the use, sale and/or distribution of any goods, services or information having similar functionality described herein.

The specification and figures should be considered in an illustrative manner, rather than a restrictive one and all modifications described herein are intended to be included within the scope of the invention claimed. Accordingly, the scope of the invention should be determined by the appended claims (as they currently exist or as later amended or added, and their legal equivalents) rather than by merely the examples described above. Steps recited in any method or process claims, unless otherwise expressly stated, may be executed in any order and are not limited to the specific order presented in any claim. Further, the elements and/or components recited in apparatus claims may be assembled or otherwise functionally configured in a variety of permutations to produce substantially the same result as the present invention. Consequently, the invention should not be interpreted as being limited to the specific configuration recited in the claims.

Benefits, other advantages and solutions mentioned herein are not to be construed as critical, required or essential features or components of any or all the claims.

As used herein, the terms "comprises", "comprising", or variations thereof, are intended to refer to a non-exclusive listing of elements, such that any apparatus, process, method, article, or composition of the invention that comprises a list of elements, that does not include only those elements recited, but may also include other elements described in the instant specification. Unless otherwise explicitly stated, the use of the term "consisting" or "consisting of" or "consisting essentially of" is not intended to limit the scope of the invention to the enumerated elements named thereafter, unless otherwise indicated. Other combinations and/or modifications of the above-described elements, materials or structures used in the practice of the present invention may be varied or adapted by the skilled artisan to other designs without departing from the general principles of the invention.

The patents and articles mentioned above are hereby incorporated by reference herein, unless otherwise noted, to the extent that the same are not inconsistent with this disclosure.

Other characteristics and modes of execution of the invention are described in the appended claims.

Further, the invention should be considered as comprising all possible combinations of every feature described in the instant specification, appended claims, and/or drawing figures which may be considered new, inventive and industrially applicable.

Copyright may be owned by the Applicant(s) or their assignee and, with respect to express Licensees to third parties of the rights defined in one or more claims herein, no implied license is granted herein to use the invention as defined in the remaining claims. Further, vis-à-vis the public or third parties, no express or implied license is granted to prepare derivative works based on this patent specification, inclusive of the appendix hereto and any computer program comprised therein.

Multiple variations and modifications are possible in the embodiments of the invention described here. Although certain illustrative embodiments of the invention have been shown and described here, a wide range of changes, modifications, and substitutions is contemplated in the foregoing disclosure. While the above description contains many specific details, these should not be construed as limitations on the scope of the invention, but rather exemplify one or another preferred embodiment thereof. In some instances, some features of the present invention may be employed without a corresponding use of the other features. Accordingly, it is appropriate that the foregoing description be construed broadly and understood as being illustrative only, the spirit and scope of the invention being limited only by the claims which ultimately issue in this application.

What is claimed is:

1. A quantum cryptography apparatus having a receiver station, and an emitter station, connected together through at least one quantum channel, a single photon detector, having setting parameters including and efficiency value and an activation timing, and an alarm subsystem adapted to detect an attack involving sending of light through the at least one quantum channel into the quantum cryptography apparatus, the attack having a goal of either taking control of the single photon detector or of obtaining knowledge on a basis choice for preparation or an analysis of qubits by the quantum cryptography apparatus, the alarm subsystem detecting said attack by randomly changing the setting parameters of the said single photon detector that defines the efficiency value or the activation timing of the said single photon detector, to measure a detection probability value of the single photon detector and compare the measured detection probability value with an expected detection probability value for the chosen setting parameters, a detection of a mismatch between the measured and expected probability values indicating an attack attempt, the indication being sending of an alarm.

2. The apparatus of claim 1, further comprising a further communications channel.

3. The apparatus of claim 1 wherein the said setting parameters of the said single-photon detectors are set independently by the said alarm subsystem for each transmitted qubit.

4. The apparatus of claim 1 wherein the said setting parameters of the said single photon detector is set by the said alarm subsystem for groups of successive qubits arriving on the said single photon detector.

5. The apparatus of claim 1 wherein the said setting parameter of the said single photon detector of the said quantum cryptography apparatus are the setting parameters impacting the detection efficiency of the said single photon detector.

6. The apparatus of claim 5 wherein the said alarm subsystem is adapted to set the said setting parameters of the efficiency to at least two different values.

7. The apparatus of claim 6 wherein the said alarm subsystem sets one of the said values of the setting parameters of the efficiency to a value that makes the efficiency value equal to zero.

8. The apparatus of claim 1, wherein the attack attempts to take control of the single photon detector.

9. The apparatus of claim 1, wherein the attack attempts to obtain knowledge on the quantum state preparation of the apparatus.

10. The apparatus of claim 1, wherein the attack attempts to gain knowledge of the quantum measurement basis chosen by the apparatus.

* * * * *